United States Patent
Ahn et al.

(10) Patent No.: US 11,031,625 B2
(45) Date of Patent: Jun. 8, 2021

(54) NON-AQUEOUS ELECTROLYTE FOR LITHIUM SECONDARY BATTERY, AND LITHIUM SECONDARY BATTERY COMPRISING THE SAME

(71) Applicant: LG Chem, Ltd., Seoul (KR)

(72) Inventors: Kyoung Ho Ahn, Daejeon (KR); Yi Jin Jung, Daejeon (KR); Yu Ra Jeong, Daejeon (KR); Chul Haeng Lee, Daejeon (KR); Young Min Lim, Daejeon (KR)

(73) Assignee: LG Chem, Ltd.

( * ) Notice: Subject to any disclaimer, the term of this patent is extended or adjusted under 35 U.S.C. 154(b) by 102 days.

(21) Appl. No.: 16/199,719

(22) Filed: Nov. 26, 2018

(65) Prior Publication Data

US 2019/0140321 A1    May 9, 2019

Related U.S. Application Data

(63) Continuation-in-part of application No. PCT/KR2017/005548, filed on May 26, 2017.

(30) Foreign Application Priority Data

May 27, 2016 (KR) .................. 10-2016-0065957

(51) Int. Cl.
| | |
|---|---|
| H01M 10/0567 | (2010.01) |
| H01M 10/0525 | (2010.01) |
| H01M 4/131 | (2010.01) |
| H01M 4/525 | (2010.01) |
| H01M 10/0568 | (2010.01) |
| H01M 4/485 | (2010.01) |

(52) U.S. Cl.
CPC ....... *H01M 10/0567* (2013.01); *H01M 4/131* (2013.01); *H01M 4/485* (2013.01); *H01M 4/525* (2013.01); *H01M 10/0525* (2013.01); *H01M 10/0568* (2013.01)

(58) Field of Classification Search
CPC ......... H01M 10/0525; H01M 10/0567; H01M 10/0568; H01M 10/0569; H01M 2/10; H01M 4/131; H01M 4/36; H01M 4/485; H01M 4/525
See application file for complete search history.

(56) References Cited

U.S. PATENT DOCUMENTS

| | | | |
|---|---|---|---|
| 2010/0178560 A1 | 7/2010 | Kim et al. | |
| 2011/0027646 A1* | 2/2011 | Lee | ........ H01M 4/131 |
| | | | 429/188 |
| 2015/0303482 A1 | 10/2015 | Buqa et al. | |
| 2018/0006329 A1* | 1/2018 | Xiao | ........ H01M 10/0569 |

FOREIGN PATENT DOCUMENTS

| | | |
|---|---|---|
| CN | 105591157 A | 5/2016 |
| JP | 2005032551 A | 2/2005 |
| KR | 101093712 B1 | 12/2011 |
| KR | 20130117710 A | 10/2013 |
| KR | 20150090075 A | 8/2015 |

OTHER PUBLICATIONS

X. Zuo, C. Fan, J. Liu, X. Xiao, J. Wu, J. Nan.Lithium Tetrafluoroborate as an Electrolyte Additive to Improve the High Voltage Performance of Lithium-Ion Battery, Journal of The Electrochemical Society, 160 (8) A1199-A1204 (2013).*
Search report from International Application No. PCT/KR2017/005548, dated Aug. 28, 2017.
Nie, Mengyun, et al., "Development of Pyridine-Boron Trifluoride Electrolyte Additives for Lithium-Ion Batteries." Journal of the Electrochemical Society, vol. 162, No. 7, Mar. 31, 2015, pp. A1186-A1195.
Nie, Mengyun, et al., "A Comparative Study of Pyridine-Boron Trifluoride, Pyrazine-(BF3)3 as Electrolyte Additives for Lithium-Ion Cells." Journal of the Electrochemical Society, vol. 162, No. 10, Jul. 30, 2015, pp. A2066-A2074.
Hall, David, S., "Surface-Electrolyte Interphase Formation in Lithium-Ion Cells Containing Pyridine Adduct Additives." Journal of the Electrochemical Society, vol. 163, No. 5, Feb. 17, 2016, pp. A-773-A780.

* cited by examiner

*Primary Examiner* — Carlos Barcena
(74) *Attorney, Agent, or Firm* — Lerner, David, Littenberg, Krumholz & Mentlik, LLP

(57) ABSTRACT

The present invention relates to a non-aqueous electrolyte for a lithium secondary battery including a pyridine-boron-based compound as an additive and a lithium secondary battery including the same, and particularly, to a non-aqueous electrolyte including at least two types of lithium salts and a pyridine-boron-based compound and a lithium secondary battery which has an enhanced effect of suppressing an increase in resistance and generation of gas after being stored at high temperature by including both the non-aqueous electrolyte and a negative electrode including lithium titanium oxide (LTO) as a negative electrode active material.

8 Claims, No Drawings

NON-AQUEOUS ELECTROLYTE FOR LITHIUM SECONDARY BATTERY, AND LITHIUM SECONDARY BATTERY COMPRISING THE SAME

CROSS-REFERENCE TO RELATED APPLICATIONS

The present application is a continuation-in-part of International Application No. PCT/KR2017/005548 filed on May 26, 2017, which claims the benefit of Korean Patent Application No. 2016-0065957, filed on May 27, 2016, in the Korean Intellectual Property Office, the disclosures of which are incorporated herein in by reference.

TECHNICAL FIELD

The present invention relates to a non-aqueous electrolyte for a lithium secondary battery and a lithium secondary battery including the same, and particularly, to a non-aqueous electrolyte for a lithium secondary battery including a pyridine-boron-based compound as an additive and a lithium secondary battery including the same.

BACKGROUND ART

As technology development and demand for mobile devices increase, demand for a secondary battery as an energy source is rapidly increasing, and among such secondary batteries, a lithium secondary battery which exhibits high energy density and voltage has been commercialized and widely used.

A lithium secondary battery is manufactured by inserting an electrode assembly in which a positive electrode including a positive electrode active material and a negative electrode including a negative electrode active material are laminated into a case and then injecting an electrolyte thereinto. As the electrolyte, a non-aqueous organic solvent that is stable at high voltage and has high ion conductivity, a high dielectric constant, and low viscosity is used.

The charging and discharging of such a lithium secondary battery are performed while a process of intercalating and deintercalating lithium ions from a lithium metal oxide of a positive electrode into/from a graphite electrode of a negative electrode is repeated.

Meanwhile, the non-aqueous organic solvent is reduced and decomposed upon initial charging and discharging, and thus a solid electrolyte interface film (hereinafter, referred to as "SEI film") is formed on surfaces of the positive electrode and the negative electrode. The SEI film, once formed, not only prevents a reaction of lithium ions with the negative electrode or other materials during repetitive charging and discharging but also suppresses a side reaction between the electrolyte and the electrode. Also, the SEI film acts as an ion tunnel through which only lithium ions pass between the electrolyte and the negative electrode.

When the SEI film does not have enough passivity to suppress additional decomposition of the electrolyte, the electrolyte is further decomposed when a battery is stored at high temperature, resulting in low-voltage failure.

Therefore, there is a need to develop a compound that can be used as an electrolyte additive for improving overall battery performance such as output characteristics, storage characteristics at high temperature, and lifespan characteristics by forming a robust SEI film on surfaces of the positive electrode and the negative electrode.

Meanwhile, as demand for a battery capable of high-speed charging is increasing in recent years, there is a growing interest in the use of lithium titanium oxide (LTO) as a negative electrode active material. The LTO has a stable structure and exhibits relatively good cycle capacity, but it is difficult to form a robust SEI film upon initial charging and discharging because a lithium secondary battery including LTO exhibits a relatively high oxidation/reduction potential with respect to the potential of $Li/Li^+$.

Therefore, gas such as $H_2$ is generated by catalytic action when the battery is stored at high temperature, and thus the thickness and internal pressure of the battery are increased, resulting in degradation of stability and cycle lifespan.

SUMMARY OF THE INVENTION

It is an aspect of the present invention to provide a non-aqueous electrolyte for a lithium secondary battery including at least two types of lithium salts and a pyridine-boron-based compound as an additive.

In addition, it is another aspect of the present invention to provide a lithium secondary battery including the non-aqueous electrolyte for a lithium secondary battery.

In order to accomplish the above objectives of the present invention, according to one embodiment of the present invention, there is provided a non-aqueous electrolyte for a lithium secondary battery comprising:

an organic solvent;

a first lithium salt;

$LiBF_4$ as a second lithium salt; and a non-aqueous electrolyte additive represented by Chemical Formula 1 below, wherein the non-aqueous electrolyte additive is included in an amount of 0.01 wt % to 8.5 wt % based on a total weight of the non-aqueous electrolyte:

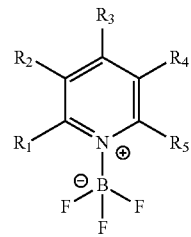

[Chemical Formula 1]

wherein $R_1$ to $R_5$ each independently are a hydrogen atom, a fluorine atom, a fluorine-substituted or unsubstituted C1 to C3 alkyl group, or —CN.

Specifically, the fluorine-substituted or unsubstituted C1 to C3 alkyl group in Chemical Formula 1 may be $CH_3$ or $CF_3$.

In addition, the non-aqueous electrolyte additive represented by Chemical Formula 1 may be selected from the group consisting of compounds represented by Chemical Formulas 1a to 1i below:

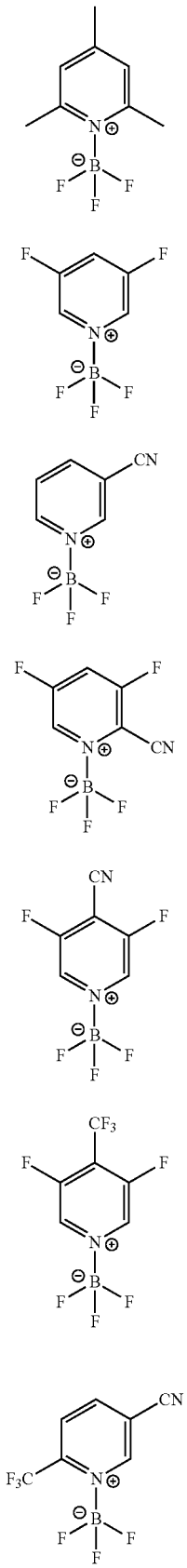

[Chemical Formula 1a]

[Chemical Formula 1b]

[Chemical Formula 1c]

[Chemical Formula 1d]

[Chemical Formula 1e]

[Chemical Formula 1f]

[Chemical Formula 1g]

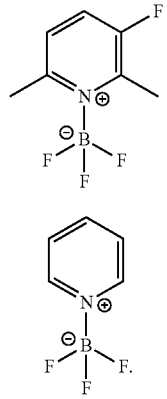

[Chemical Formula 1h]

[Chemical Formula 1i]

Specifically, the non-aqueous electrolyte additive represented by Chemical Formula 1 may be selected from the group consisting of compounds represented by Chemical Formulas 1a, 1b, 1d, 1e, 1f, 1g, and 1i.

In addition, the non-aqueous electrolyte additive represented by Chemical Formula 1 may be included in an amount of 0.01 wt % to 7.0 wt %, particularly, 0.1 wt % to 7.0 wt % based on a total weight of the non-aqueous electrolyte.

According to another embodiment of the present invention, there is provided a lithium secondary battery comprising a negative electrode, a positive electrode, a separator interposed between the negative electrode and the positive electrode, and a non-aqueous electrolyte, wherein the negative electrode includes lithium titanium oxide (LTO) as a negative electrode active material, and the non-aqueous electrolyte is the non-aqueous electrolyte for a lithium secondary battery of the present invention.

In this case, the LTO may be at least one selected from the group consisting of $Li_{0.8}Ti_{2.2}O_4$, $Li_{2.67}Ti_{1.33}O_4$, $Li_{1.14}Ti_{1.71}O_4$, $Li_{1.33}Ti_{1.67}O_4$, $Li_4Ti_5O_{12}$, and $LiTi_2O_4$, and may particularly be $Li_{1.33}Ti_{1.67}O_4$.

In addition, the positive electrode may include at least one positive electrode active material selected from the group consisting of a lithium-manganese-based oxide, a lithium-nickel-manganese-based oxide, a lithium-manganese-cobalt-based oxide, and a lithium-nickel-manganese-cobalt-based oxide, and the positive electrode active material may particularly be $LiMnO_2$ or $LiMn_2O_4$ (LMO).

[Modes of the Invention]

Hereinafter, the present invention will be described in more detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The present inventors have ardently conducted research to enhance stability of a battery using LTO as a negative electrode active material by suppressing the generation of gas when the battery is stored at high temperature, and found that, when a non-aqueous electrolyte including a pyridine-boron-based derivative is introduced, a stable SEI film may be formed on a surface of a negative electrode including LTO as a negative electrode active material to prevent a side reaction of an electrolyte of the lithium secondary battery, and thus an increase in resistance and the generation of gas may be suppressed. Therefore, the present invention has been completed based on these facts.

Non-Aqueous Electrolyte for Lithium Secondary Battery

According to one embodiment of the present invention, there is provided a non-aqueous electrolyte for a lithium secondary battery, which includes an organic solvent; a first lithium salt; $LiBF_4$ as a second lithium salt; and a non-aqueous electrolyte additive represented by Chemical Formula 1 below, wherein the non-aqueous electrolyte additive is included in an amount of 0.01 wt % to 8.5 wt % based on a total weight of the non-aqueous electrolyte.

[Chemical Formula 1]

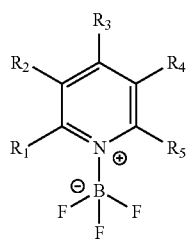

In Chemical Formula 1, $R_1$ to $R_5$ each independently are a hydrogen atom, a fluorine atom, a fluorine-substituted or unsubstituted C1 to C3 alkyl group, or —CN.

(1) Organic Solvent

In the non-aqueous electrolyte for a lithium secondary battery according to an embodiment of the present invention, the organic solvent is not limited in types thereof as long as it may be minimally decomposed by an oxidation reaction or the like in charging and discharging of a secondary battery and may exhibit a desired property when being used together with an additive. For example, a carbonate-based organic solvent, an ether-based organic solvent, an ester-based organic solvent, and the like may be used alone or in combination of two or more thereof.

Among the organic solvents, the carbonate-based organic solvent may include at least one selected from a cyclic carbonate-based organic solvent and a linear carbonate-based organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and more specifically, include a mixed solvent of EC having a high dielectric constant and PC having a relatively lower melting point than that of EC.

In addition, the linear carbonate-based organic solvent may include, as a solvent having low viscosity and a low dielectric constant, at least one selected from the group consisting of dimethyl carbonate (DMC), diethyl carbonate (DEC), dipropyl carbonate, ethyl methyl carbonate (EMC), methyl propyl carbonate, and ethyl propyl carbonate, and more specifically, include DMC.

The ether-based organic solvent may be any one or a mixture of two or more selected from the group consisting of dimethyl ether, diethyl ether, dipropyl ether, methyl ethyl ether, methyl propyl ether, and ethyl propyl ether, but the present invention is not limited thereto.

The ester-based organic solvent may be at least one selected from the group consisting of a linear ester-based organic solvent and a cyclic ester-based organic solvent.

Specifically, the linear ester-based organic solvent may be any one or a mixture of two or more selected from the group consisting of methyl acetate, ethyl acetate, propyl acetate, methyl propionate, ethyl propionate, propyl propionate, and butyl propionate, but the present invention is not limited thereto.

Specifically, the cyclic ester-based organic solvent may be any one or a mixture of two or more selected from the group consisting of γ-butyrolactone, γ-valerolactone, γ-caprolactone, σ-valerolactone, and ε-caprolactone, but the present invention is not limited thereto.

The organic solvent may be the cyclic carbonate-based organic solvent with high viscosity, which dissociates a lithium salt in the electrolyte effectively due to its high dielectric constant. Also, an electrolyte solution having high electrical conductivity may be prepared when the above cyclic carbonate-based compound is mixed with the linear carbonate-based compound with low viscosity and a low dielectric constant such as DMC and DEC and the linear ester-based compound, in an appropriate ratio and used.

More specifically, the organic solvent may be a mixture of the cyclic carbonate-based compound and the linear carbonate-based compound, and a weight ratio of the cyclic carbonate-based compound to the linear carbonate-based compound in the organic solvent may be 10:90 to 70:30.

(2) First Lithium Salt

In the non-aqueous electrolyte for a lithium secondary battery according to an embodiment of the present invention, the first lithium salt may be a lithium salt commonly used in an electrolyte for a lithium secondary battery without limitation. Representative examples of the first lithium salt include lithium salts, other than $LiBF_4$, having $Li^+$ as a cation and any one selected from the group consisting of $F^-$, $Cl^-$, $Br^-$, $NO_3^-$, $N(CN)_2^-$, $ClO_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$, and $(CF_3CF_2SO_2)_2N^-$ as an anion.

Specifically, the first lithium salt may be a single compound or a mixture of two or more selected from the group consisting of LiCl, LiBr, LiI, $LiClO_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, $LiCH_3SO_3$, lithium fluorosulfonyl imide (LiFSI, $LiN(SO_2F)_2$), lithium (bis)trifluoromethanesulfonimide (LiTFSI, $LiN(SO_2CF_3)_2$), and lithium bisperfluoroethanesulfonimide (LiBETI, $LiN(SO_2C_2F_5)_2$).

More specifically, the first lithium salt may be $LiPF_6$.

Although the lithium salt may be appropriately adjusted within a commonly available range, specifically, it may be included in an electrolyte at a concentration of 0.1 M to 2 M, particularly, 0.8 M to 2 M. When the lithium salt is included at a concentration of greater than 2 M, viscosity of the non-aqueous electrolyte increases, and thus lithium ions may not smoothly migrate, and wettability of the non-aqueous electrolyte is degraded. As a result, it is difficult to form a uniform SEI film.

(3) Second Lithium Salt

The second lithium salt, $LiBF_4$, is included as an additive in the non-aqueous electrolyte and may be included in an amount of 0.1 wt % to 20 wt %, particularly, 0.1 wt % to 5 wt % based on a total weight of the non-aqueous electrolyte.

When the second lithium salt is included within the above range, a secondary battery having various enhanced performances may be manufactured. Specifically, when the second lithium salt is included in an amount of 0.1 wt % or more, an optimum SEI film may be formed on an electrode surface to prevent a number of irreversible reactions caused by intercalating lithium ions which are solvated with a carbonate-based solvent into a negative electrode, and thus the high-temperature storage stability of a secondary battery may be further improved. Also, when the second lithium salt is included in an amount of 20 wt % or less, excessive occurrence of side reactions caused by an excess second lithium salt in an electrolyte upon charging and discharging of a secondary battery may be prevented, and thus it is possible to suppress a swelling phenomenon and prevent corrosion of an electrode in an electrolyte.

(4) Additive

In addition, the non-aqueous electrolyte for a lithium secondary battery according to the present invention may include a non-aqueous electrolyte additive represented by Chemical Formula 1 below in an amount of 0.01 wt % to 8.5 wt % based on a total weight of the non-aqueous electrolyte.

[Chemical Formula 1]

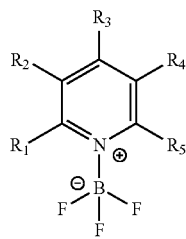

In Chemical Formula 1, $R_1$ to $R_5$ each independently are a hydrogen atom, a fluorine atom, a fluorine-substituted or unsubstituted C1 to C3 alkyl group, or —CN.

Specifically, the fluorine-substituted or unsubstituted C1 to C3 alkyl group in Chemical Formula 1 may be $CH_3$ or $CF_3$.

A carbon-based material conventionally used as a negative electrode active material exhibits high initial discharge capacity, but irreversibility thereof is increased by consuming an excessive amount of lithium during an initial charging process, and thus its use is limited. On this other hand, lithium titanium oxide (LTO) has a stable structure and exhibits relatively good cycle capacity.

However, in the case of LTO, an electrolyte is hardly decomposed, and a lithium secondary battery including LTO exhibits a relatively high oxidation/reduction potential of a negative electrode, that is, about 1.2 V to 1.5 V with respect to the potential of $Li/Li^+$, and thus it is difficult to form a SEI film by using an additive commonly used in the art. That is, in the case of the secondary battery including a negative electrode containing LTO, since the catalytic action of $Ti^{4+}$ at a surface of LTO promotes the reduction of a commonly used carbonate-based solvent, it is difficult to effectively form a SEI film. Therefore, since LTO acts as a kind of catalyst when the battery is stored at high temperature, corrosion of an electrode, a swelling phenomenon caused by a large amount of hydrogen gas generated in an activation process and a charging/discharging process, and explosion in severe cases are caused, and thus the safety of the secondary battery is degraded.

Accordingly, in the present invention, since the pyridine-boron-based compound represented by Chemical Formula 1 is included in an electrolyte, an anion of the lithium salt is stabilized, and simultaneously, a more stable and robust SEI film is formed on the surface of a LTO negative electrode. Therefore, it is possible to suppress the decomposition of an electrolyte in a battery when the battery is stored at high temperature and the generation of gas according thereto, and thus lifespan characteristics of the lithium secondary battery may be improved. Therefore, the secondary battery including the non-aqueous electrolyte containing the pyridine-boron-based compound according to an embodiment of the present invention may exhibit enhanced storage characteristics at high temperature. Meanwhile, when the non-aqueous electrolyte including the compound represented by Chemical Formula 1 is applied to a secondary battery using a graphite-based negative electrode active material, the compound represented by Chemical Formula 1 is reduced at the surface of a negative electrode, which interferes with a film-forming reaction by an additive for forming a SEI film, such as vinylene carbonate, and the like, and thus a stable SEI film is not formed. Accordingly, it is preferable to avoid applying the non-aqueous electrolyte including the compound represented by Chemical Formula 1 to a secondary battery using the graphite-based negative electrode active material.

Meanwhile, the non-aqueous electrolyte additive represented by Chemical Formula 1 may be selected from the group consisting of compounds represented by Chemical Formulas 1a to 1i below.

[Chemical Formula 1a]

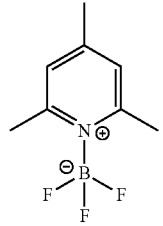

[Chemical Formula 1b]

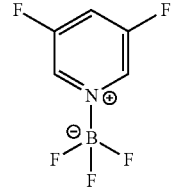

[Chemical Formula 1c]

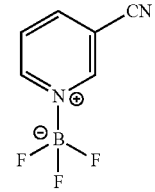

[Chemical Formula 1d]

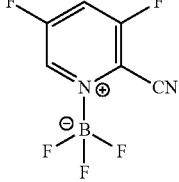

[Chemical Formula 1e]

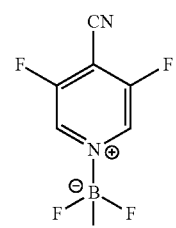

[Chemical Formula 1f]

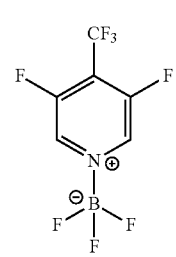

[Chemical Formula 1g]

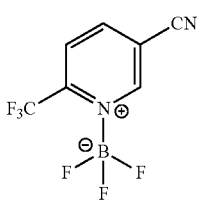

[Chemical Formula 1h]

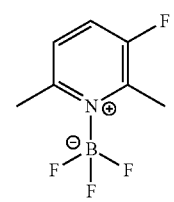

[Chemical Formula 1i]

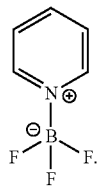

Specifically, the non-aqueous electrolyte additive represented by Chemical Formula 1 may be selected from the group consisting of the compounds represented by Chemical Formulas 1a, 1b, 1d, 1e, 1f, 1g, and 1i, and more specifically, may be selected from the group consisting of the compounds represented by Chemical Formulas 1b, 1d, 1f, and 1g.

An amount of the compound represented by Chemical Formula 1 is not limited as long as it is an amount required to achieve the effects of the present invention, such as an improvement in cycle capacity and lifespan characteristics. Specifically, when the compound is included in an amount of 8.5 wt % or less, particularly 0.01 wt % to 7.0 wt %, more particularly 0.1 wt % to 7.0 wt %, even more particularly 0.1 wt % to 5.0 wt %, and most particularly 0.1 wt % to 2.0 wt % based on a total weight of the electrolyte, a secondary battery having various enhanced performances may be manufactured. Specifically, when the additive is included in an amount of 0.01 wt % or more, particularly, 0.1 wt % or more, stabilization performance of an anion may be easily ensured, and when the additive is included in an amount of 8.5 wt % or less, particularly, 7.0 wt % or less, an increase in resistance may be effectively prevented.

In some cases, the non-aqueous electrolyte according to an embodiment of the present invention may further include an additional additive that may act as a complementary material for forming a stable thin film on the surfaces of a negative electrode and a positive electrode, suppressing the decomposition of a solvent in the non-aqueous electrolyte, and enhancing mobility of lithium ions while not significantly increasing initial resistance in addition to the effects of the additive.

Such an additional additive is not particularly limited as long as it is an additive for forming a SEI film, which may form a stable thin film on the surfaces of a positive electrode and a negative electrode.

Specifically, the additive for forming a SEI film may include at least one selected from the group consisting of a sultone-based compound, a halogen-substituted carbonate-based compound, a nitrile-based compound, a cyclic sulfite-based compound, a cyclic carbonate-based compound, a phosphate-based compound, and a borate-based compound.

The sultone-based compound may be at least one selected from the group consisting of 1,3-propane sultone (PS), 1,4-butane sultone, ethene sultone, 1,3-propene sultone (PRS), 1,4-butene sultone, and 1-methyl-1,3-propene sultone. The sultone-based compound may be included in an amount of 5 wt % or less based on a total weight of the non-aqueous electrolyte. When the sultone-based compound is included in an amount of greater than 5 wt % in the non-aqueous electrolyte, a thick film is formed due to an excessive amount of the additive, and thus resistance may increase, and output characteristics may be degraded.

In addition, the halogen-substituted carbonate-based compound may be fluoroethylene carbonate (FEC), and may be included in an amount of 5 wt % or less based on a total weight of the non-aqueous electrolyte. When the halogen-substituted carbonate-based compound is included in an amount of greater than 5 wt %, the ability to inhibit the swelling of a cell may be degraded.

In addition, the nitrile-based compound may be at least one selected from the group consisting of succinonitrile, adiponitrile (ADN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenyl acetonitrile, 2-fluorophenyl acetonitrile, and 4-fluorophenyl acetonitrile.

The nitrile-based compound may be included in an amount of 8 wt % or less based on a total weight of the non-aqueous electrolyte. When the nitrile-based compound is included in an amount of greater than 8 wt % in the non-aqueous electrolyte, resistance is increased due to an increase in the thickness of a film formed on the electrode surface, and thus battery performance may be degraded.

In addition, the cyclic sulfite-based compound may be ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like, and may be included in an amount of 5 wt % or less based on a total weight of the non-aqueous electrolyte. When the cyclic sulfite-based compound is included in an amount of greater than 5 wt %, a thick film is formed due to an excessive amount of the additive, and thus resistance may increase, and output characteristics may be degraded.

In addition, the cyclic carbonate-based compound may be vinylene carbonate (VC) or vinyl ethylene carbonate, and may be included in an amount of 3 wt % or less based on a total weight of the non-aqueous electrolyte. When the cyclic carbonate-based compound is included in an amount of greater than 3 wt % in the non-aqueous electrolyte, the ability to inhibit the swelling of a cell may be degraded.

In addition, the phosphate-based compound helps to stabilize an anion of $PF_6$ in an electrolyte and form a film on the positive electrode and the negative electrode, and thus may promote an improvement in durability of the battery. Such a phosphate-based compound may be at least one selected from the group consisting of lithium difluoro(bisoxalato)phosphate (LiDFOP), LiDFP ($LiPO_2F_2$), tetramethyl trimethylsilyl phosphate (LiTFOP), trimethylsilyl phosphite (TMSPi), tris(2,2,2-trifluoroethyl)phosphate (TFEPa), and tris(trifluoroethyl) phosphite (TFEPi), and may be included in an amount of 3 wt % or less based on a total weight of the non-aqueous electrolyte.

The borate-based compound may promote the separation of an ion pair of a lithium salt to enhance mobility of lithium ions, may decrease interfacial resistance of a SEI film, and may dissociate a compound such as LiF, which is produced during operation of the battery and is not easily separated, to solve problems such as generation of hydrogen fluoride gas. Such a borate-based compound may be lithium bioxalylborate (LiBOB, $LiB(C_2O_4)_2$), lithium oxalyldifluoroborate, or tetramethyl trimethylsilyl borate (TMSB), and may be included in an amount of 3 wt % or less based on a total weight of the non-aqueous electrolyte.

The additive for forming a SEI film may be used after mixing at least two types thereof and may be included in an amount of 10 wt % or less, particularly 0.01 wt % to 10 wt %, and more particularly 0.1 wt % to 5.0 wt % based on a total weight of the electrolyte.

When the additive for forming a SEI film is included in an amount of less than 0.01 wt %, the storage characteristics at high temperature and a gas reduction effect to be implemented by the additive may be negligible. Also, when the additive for forming a SEI film is included in an amount of greater than 10 wt %, a side reaction in the electrolyte is likely to excessively occur upon charging and discharging of the battery. In particular, when an excessive amount of the additive for forming a SEI film is added, the additive is insufficiently decomposed and thus remains unreacted or deposited in the electrolyte at room temperature. As a result, resistance increases, and thus lifespan characteristics of the secondary battery may be degraded.

Lithium Secondary Battery

According to another embodiment of the present invention, there is provided a lithium secondary battery including a negative electrode, a positive electrode, a separator interposed between the negative electrode and the positive electrode, and a non-aqueous electrolyte, wherein the negative electrode includes lithium titanium oxide (LTO) as a negative electrode active material, and the non-aqueous electrolyte is the non-aqueous electrolyte for a lithium secondary battery according to the present invention.

(1) Negative Electrode

Specifically, the lithium secondary battery according to the present invention may be manufactured by injecting the non-aqueous electrolyte according to the present invention into an electrode assembly composed of a negative electrode, a positive electrode and a separator interposed between the negative electrode and the positive electrode. In this case, the negative electrode, the positive electrode, and the separator, which constitute the electrode assembly, may be any one commonly used to manufacture a lithium secondary battery.

First, the negative electrode may be manufactured by forming a negative electrode mixture layer on a negative electrode current collector. The negative electrode mixture layer may be formed by applying a slurry including a negative electrode active material, a binder, a conductive material, a solvent, and the like, followed by drying and rolling.

The negative electrode current collector generally has a thickness of 3 to 500 µm. Such a negative electrode current collector is not particularly limited as long as it does not cause a chemical change in the battery and has high conductivity. For example, the negative electrode current collector is copper, stainless steel, aluminum, nickel, titanium, calcined carbon, copper or stainless steel whose surface is treated with carbon, nickel, titanium, silver, or the like, an aluminum-cadmium alloy, or the like. Also, the negative electrode current collector, like a positive electrode current collector, may have fine irregularities at a surface thereof to increase adhesion of the negative electrode active material. In addition, the negative electrode current collector may be used in any of various forms such as a film, a sheet, a foil, a net, a porous material, a foam, a non-woven fabric, and the like.

In addition, LTO included as the negative electrode active material may be a single compound or a mixture of two or more selected from the group consisting of $Li_{0.8}Ti_{2.2}O_4$, $Li_{2.67}Ti_{1.33}O_4$, $Li_{1.14}Ti_{1.71}O_4$, $Li_{1.33}Ti_{1.67}O_4$, $Li_4Ti_5O_{12}$, and $LiTi_2O_4$, and particularly, may be $Li_{1.33}Ti_{1.67}O_4$ which has a spinel structure with excellent reversibility and exhibits a slight change in a crystal structure upon charging and discharging.

In this case, the negative electrode active material may be 100% lithium-containing titanium composite oxide (LTO), and, if necessary, may further include other negative electrode active materials in addition to LTO.

Such a negative electrode active material may further include, for example, a single compound or a mixture of two or more selected from the group consisting of a carbon-based material such as hard carbon, graphite-based carbon, and the like; a metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2, and Group 3 elements in the periodic table, halogen elements; $0<x \leq 1$; $1 \leq y \leq 3$; $1 \leq z \leq 8$); lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, and the like; and a conductive polymer such as polyacetylene and the like.

The negative electrode active material may be included in an amount of 80 wt % to 99 wt % based on a total weight of solids in the negative electrode slurry.

The binder is a component that assists binding between a conductive material, an active material, and a current collector, and is commonly added in an amount of 1 to 30 wt % based on a total weight of solids in the negative electrode slurry. Examples of such a binder include polyvinylidene fluoride (PVDF), polyvinyl alcohol, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene polymer (EPDM), a sulfonated EPDM, styrene-butadiene rubber, fluororubber, various copolymers thereof, and the like.

The conductive material is a component for further enhancing the conductivity of the negative electrode active material, and may be added in an amount of 1 to 20 wt % based on a total weight of solids in the negative electrode slurry. Such a conductive material is not particularly limited as long as it does not cause a chemical change in the battery and has conductivity. Examples of the conductive material include carbon powder such as carbon black, acetylene black, Ketjen black, channel black, furnace black, lamp black, thermal black, and the like; graphite powder with a highly developed crystal structure such as natural graphite, artificial graphite, graphite, and the like; a conductive fiber such as carbon fiber, metallic fiber, and the like; metallic powder such as carbon fluoride powder, aluminum powder, nickel powder, and the like; a conductive whisker such as zinc oxide, potassium titanate, and the like; a conductive metal oxide such as titanium oxide and the like; and a conductive material such as a polyphenylene derivative and the like.

Examples of the solvent include water or an organic solvent such as NMP, an alcohol, and the like, and the solvent may be used in an amount in which preferable viscosity is exhibited when the negative electrode active material and optionally a binder, a conductive material, and the like are included. For example, the solvent may be included in such a way that a solid concentration in a slurry including a negative electrode active material and optionally a binder and a conductive material is 50 wt % to 85 wt %, preferably, 50 wt % to 75 wt %.

(2) Positive Electrode

In addition, the positive electrode may be manufactured by forming a positive electrode mixture layer on a positive electrode current collector. The positive electrode mixture layer may be formed by applying a positive electrode slurry including a positive electrode active material, a binder, a conductive material, a solvent, and the like, followed by drying and rolling.

The positive electrode current collector is not particularly limited as long as it does not cause a chemical change in the battery and has conductivity. For example, the positive electrode current collector is stainless steel, aluminum, nickel, titanium, calcined carbon, or aluminum or stainless steel whose surface is treated with carbon, nickel, titanium, silver, or the like.

The positive electrode active material may be a compound capable of reversible intercalation and deintercalation of lithium ions, and specifically, may include a lithium metal oxide containing lithium and manganese. More specifically, examples of the lithium metal oxide include lithium-manganese-based oxides (e.g., $LiMnO_2$, $LiMn_2O_4$, and the like), lithium-nickel-manganese-based oxides (e.g., $LiNi_{1-Y}Mn_YO_2$ (where $0<Y<1$), $LiMn_{2-Z}Ni_ZO_4$ (where $0<Z<2$), and the like), lithium-manganese-cobalt-based oxides (e.g., $LiCo_{1-Y2}Mn_{Y2}O_2$ (where $0<Y2<1$), $LiMn_{2-Z1}Co_{Z1}O_4$ (where $0<Z1<2$), and the like), lithium-nickel-manganese-cobalt-based oxides (e.g., $Li(Ni_pCo_qMn_{r1})O_2$ (where $0<p<1$, $0<q<1$, $0<r1<1$, and $p+q+r1=1$), $Li(Ni_{p1}Co_{q1}Mn_{r2})O_4$ (where $0<p1<2$, $0<q1<2$, $0<r2<2$, and $p1+q1+r2=2$), and the like).

Among these compounds, in terms of improving capacity characteristics and stability of the battery, the lithium metal oxide may be $LiMnO_2$, $LiMn_2O_4$, or a lithium-nickel-manganese-cobalt-based oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like). In particular, in order to further improve an effect of output characteristics after storage to be realized by an increase in voltage, the lithium metal oxide may be a lithium-manganese-based oxide such as $LiMnO_2$ or $LiMn_2O_4$ (LMO).

In addition, the positive electrode active material may further include lithium-cobalt-based oxides (e.g., $LiCoO_2$ and the like), lithium-nickel-based oxides (e.g., $LiNiO_2$ and the like), lithium-nickel-cobalt-based oxides (e.g., $LiNi_{1-Y1}Co_{Y1}O_2$ (where $0<Y1<1$) and the like), or lithium-nickel-cobalt-transition metal (M) oxides (e.g., $Li(Ni_{p2}Co_{q2}Mn_{r3}M_{S2})O_2$ (where M is selected from the group consisting of Al, Fe, V, Cr, Ti, Ta, Mg, and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$) and the like).

The positive electrode active material may be included in an amount of 80 wt % to 99 wt % based on a total weight of solids in the positive electrode slurry.

The binder is a component that assists binding between an active material and a conductive material and binding to a current collector, and is commonly added in an amount of 1 to 30 wt % based on a total weight of solids in the positive electrode slurry. Examples of such a binder include polyvinylidene fluoride, polyvinyl alcohol, carboxymethyl cellulose, starches, hydroxypropyl cellulose, regenerated cellulose, polyvinyl pyrrolidone, tetrafluoroethylene, polyethylene, polypropylene, an ethylene-propylene-diene terpolymer, a sulfonated EPDM, styrene-butadiene rubber, fluororubber, various copolymers thereof, and the like.

The conductive material is commonly added in an amount of 1 to 30 wt % based on a total weight of solids in the positive electrode slurry.

Such a conductive material is not particularly limited as long as it does not cause a chemical change in the battery and has conductivity. Examples of the conductive material include carbon powder such as carbon black, acetylene black, Ketjen black, channel black, furnace black, lamp black, thermal black, and the like; graphite powder with a highly developed crystal structure such as natural graphite, artificial graphite, graphite, and the like; a conductive fiber such as carbon fiber, metallic fiber, and the like; metallic powder such as carbon fluoride powder, aluminum powder, nickel powder, and the like; a conductive whisker such as zinc oxide, potassium titanate, and the like; a conductive metal oxide such as titanium oxide and the like; and a conductive material such as a polyphenylene derivative and the like.

Examples of the solvent include an organic solvent such as NMP and the like, and the solvent may be used in an amount in which preferable viscosity is exhibited when the positive electrode active material and optionally a binder, a conductive material, and the like are included. For example, the solvent may be included in such a way that a solid concentration in a slurry including a positive electrode active material and optionally a binder and a conductive material is 10 wt % to 70 wt %, preferably, 20 wt % to 60 wt %.

(3) Separator

In addition, the separator may be a common porous polymer film conventionally used as a separator, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof. Alternatively, the separator may be a common porous non-woven fabric, for example, a non-woven fabric made of glass fiber with a high melting point, polyethylene terephthalate fiber or the like, but the present invention is not limited thereto.

The appearance of the lithium secondary battery according to the present invention is not particularly limited, but it may be in any of various forms such as a cylindrical form, a prismatic form, a pouch form, a coin form and the like depending on the purpose to be performed. The lithium secondary battery according to an embodiment of the present invention may be a secondary battery in a pouch form.

In the case of a conventional secondary battery manufactured by applying a LTO negative electrode, gas is generated when the battery is stored at high temperature, and thus the thickness and internal pressure of the battery are increased, resulting in a degradation of stability and cycle lifespan.

Accordingly, in the present invention, the lithium secondary battery which includes the negative electrode including LTO as a negative electrode active material and the non-aqueous electrolyte including a pyridine-boron-based compound as an additive and two types of lithium salts, wherein one of the two types of lithium salts is $LiBF_4$ without exception, may be provided to suppress a side reaction of an electrode and an electrolyte by a stabilization reaction of an anion of a salt and thus the generation of gas.

Further, the lithium metal oxide, particularly, $LiMn_2O_4$ (LMO) may be used for the positive electrode to achieve an effect of increasing high-temperature storage stability and output characteristics.

Hereinafter, the present invention will be described in detail with reference to embodiments. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

EXAMPLES

Example 1

(Preparation of Non-Aqueous Electrolyte)

1.0 g of $LiBF_4$ and 0.3 g of a compound represented by Chemical Formula 1a were added to 98.7 g of an organic solvent in which 1 M $LiPF_6$ was dissolved (propylene carbonate (PC):ethyl methyl carbonate (EMC)=volume ratio of 30:70) to prepare a non-aqueous electrolyte for a lithium secondary battery.

(Manufacture of Positive Electrode)

$LiMn_2O_4$ (LMO) as a positive electrode active material, carbon black as a conductive material, and polyvinylidene fluoride (PVDF) as a binder were added to N-methyl-2-pyrrolidone (NMP) in a weight ratio of 90:5:5 to prepare a positive electrode active material slurry (solid content: 45 wt %). The positive electrode active material slurry was applied on a positive electrode current collector (an Al thin film) having a thickness of 100 µm, dried, and rolled (roll-pressed) to manufacture a positive electrode.

(Manufacture of Negative Electrode)

$Li_{1.33}Ti_{1.67}O_4$ as a negative electrode active material, Denka black as a conductive material, and PVDF as a binder were added to NMP in a weight ratio of 95:2.5:2.5 to prepare a negative electrode active material slurry (solid content: 80 wt %). The negative electrode active material slurry was applied on a copper foil having a thickness of 20 µm, dried, and rolled to manufacture a negative electrode.

(Manufacture of Secondary Battery)

The positive electrode and the negative electrode manufactured by the above methods were laminated together with a porous polyethylene film to manufacture an electrode assembly. Afterward, the electrode assembly was put into a pouch-type battery case, the prepared non-aqueous electrolyte was injected thereinto, and then the battery case was sealed to manufacture a lithium secondary battery.

Example 2

A non-aqueous electrolyte for a lithium secondary battery and a lithium secondary battery including the same were manufactured in the same manner as in Example 1 except that a compound represented by Chemical Formula 1b was added instead of the compound represented by Chemical Formula 1a in the preparation of a non-aqueous electrolyte.

Example 3

A non-aqueous electrolyte for a lithium secondary battery and a lithium secondary battery including the same were manufactured in the same manner as in Example 1 except that a compound represented by Chemical Formula 1c was added instead of the compound represented by Chemical Formula 1a in the preparation of a non-aqueous electrolyte.

Example 4

A non-aqueous electrolyte for a lithium secondary battery and a lithium secondary battery including the same were manufactured in the same manner as in Example 1 except that a compound represented by Chemical Formula 1d was added instead of the compound represented by Chemical Formula 1a in the preparation of a non-aqueous electrolyte.

Example 5

A non-aqueous electrolyte for a lithium secondary battery and a lithium secondary battery including the same were manufactured in the same manner as in Example 1 except that a compound represented by Chemical Formula 1e was added instead of the compound represented by Chemical Formula 1a in the preparation of a non-aqueous electrolyte.

Example 6

A non-aqueous electrolyte for a lithium secondary battery and a lithium secondary battery including the same were manufactured in the same manner as in Example 1 except that a compound represented by Chemical Formula 1f was added instead of the compound represented by Chemical Formula 1a in the preparation of a non-aqueous electrolyte.

Example 7

A non-aqueous electrolyte for a lithium secondary battery and a lithium secondary battery including the same were manufactured in the same manner as in Example 1 except that a compound represented by Chemical Formula 1g was added instead of the compound represented by Chemical Formula 1a in the preparation of a non-aqueous electrolyte.

Example 8

A non-aqueous electrolyte for a lithium secondary battery and a lithium secondary battery including the same were manufactured in the same manner as in Example 1 except that a compound represented by Chemical Formula 1h was added instead of the compound represented by Chemical Formula 1a in the preparation of a non-aqueous electrolyte.

Example 9

A non-aqueous electrolyte for a lithium secondary battery and a lithium secondary battery including the same were manufactured in the same manner as in Example 1 except that a compound represented by Chemical Formula 1i was added instead of the compound represented by Chemical Formula 1a in the preparation of a non-aqueous electrolyte.

Example 10

(Preparation of Non-Aqueous Electrolyte)
1.0 g of $LiBF_4$ and 0.05 g of a compound represented by Chemical Formula 1a were added to 98.95 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Example 11

(Preparation of Non-Aqueous Electrolyte)
1.0 g of $LiBF_4$ and 7.0 g of a compound represented by Chemical Formula 1a were added to 92 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Example 12

(Preparation of Non-Aqueous Electrolyte)
1.0 g of $LiBF_4$ and 0.01 g of a compound represented by Chemical Formula 1a were added to 98.99 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Comparative Example 1

(Preparation of Non-Aqueous Electrolyte)
1.0 g of $LiBF_4$ was added to 99 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.
Comparative Example 2.
(Preparation of Non-Aqueous Electrolyte)
0.3 g of a compound represented by Chemical Formula 1a was added to 99.7 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Comparative Example 3

(Preparation of Non-Aqueous Electrolyte)
0.3 g of a compound represented by Chemical Formula 1i was added to 99.7 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Comparative Example 4

A non-aqueous electrolyte for a lithium secondary battery and a lithium secondary battery including were manufactured in the same manner as in Example 1 except that LiFSI was used instead of $LiBF_4$ as a second lithium salt in the preparation of a non-aqueous electrolyte.

Comparative Example 5

(Preparation of Non-Aqueous Electrolyte)
1.0 g of $LiBF_4$ and 0.3 g of a compound represented by Chemical Formula 1a were added to 98.7 g of an organic solvent not including a first lithium salt (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.
Comparative Example 6.
(Preparation of Non-Aqueous Electrolyte)
1.0 g of $LiBF_4$ and 10 g of a compound represented by Chemical Formula 1a were added to 89 g of an organic solvent in which 1 M $LiPF_6$ was dissolved (PC:EMC=volume ratio of 30:70) to prepare a non-aqueous electrolyte for a lithium secondary battery.
(Manufacture of Lithium Secondary Battery)
A lithium secondary battery was manufactured in the same manner as in Example 1 except that the prepared non-aqueous electrolyte was used.

Comparative Example 7

(Preparation of Non-Aqueous Electrolyte)
0.3 g of a compound represented by Chemical Formula 1c was added to 99.7 g of an organic solvent in which 1 M $LiPF_6$ was dissolved (ethylene carbonate (EC):EMC=volume ratio of 30:70) to prepare a non-aqueous electrolyte for a lithium secondary battery.
(Manufacture of Negative Electrode)
Graphite as a negative electrode active material, carbon black as a conductive material, and PVDF as a binder were added to NMP in a weight ratio of 90:5:5 to prepare a negative electrode active material slurry (solid content: 80 wt %). The negative electrode active material slurry was applied on a copper foil having a thickness of 20 μm, dried, and rolled to manufacture a negative electrode.
(Manufacture of Secondary Battery)
The positive electrode manufactured in Example 1, a porous polyethylene film, and the negative electrode manufactured by the above method were laminated to manufacture an electrode assembly. Afterward, the electrode assembly was put into a pouch-type battery case, the prepared non-aqueous electrolyte was injected thereinto, and then the battery case was sealed to manufacture a lithium secondary battery.

Comparative Example 8

(Preparation of Non-Aqueous Electrolyte)

1.0 g of $LiBF_4$ and 0.3 g of a compound represented by Chemical Formula 1c were added to 98.7 g of an organic solvent in which 1 M $LiPF_6$ was dissolved (EC:EMC=volume ratio of 30:70) to prepare a non-aqueous electrolyte for a lithium secondary battery.

(Manufacture of Secondary Battery)

A lithium secondary battery was manufactured in the same manner as in Comparative Example 7 except that the prepared non-aqueous electrolyte was used.

Comparative Example 9

(Preparation of Non-Aqueous Electrolyte)

0.3 g of a compound represented by Chemical Formula 2 below was added to 99.7 g of an organic solvent in which 1 M $LiPF_6$ was dissolved (PC:EMC=volume ratio of 30:70) to prepare a non-aqueous electrolyte for a lithium secondary battery.

[Chemical Formula 2]

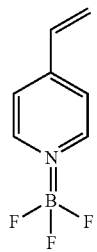

(Manufacture of Lithium Secondary Battery)

A lithium secondary battery was manufactured in the same manner as in Example 1 except that the prepared non-aqueous electrolyte was used.

Comparative Example 10

(Preparation of Non-Aqueous Electrolyte)

1.0 g of $LiBF_4$ and 0.3 g of the compound represented by Chemical Formula 2 were added to 98.7 g of an organic solvent in which 1 M $LiPF_6$ was dissolved (PC:EMC=volume ratio of 30:70) to prepare a non-aqueous electrolyte for a lithium secondary battery.

(Manufacture of Lithium Secondary Battery)

A lithium secondary battery was manufactured in the same manner as in Example 1 except that the prepared non-aqueous electrolyte was used.

Comparative Example 11

(Preparation of Non-Aqueous Electrolyte)

0.3 g of the compound represented by Chemical Formula 2 was added to 99.7 g of an organic solvent in which 1 M $LiPF_6$ was dissolved (EC:EMC=volume ratio of 30:70) to prepare a non-aqueous electrolyte for a lithium secondary battery.

(Manufacture of Lithium Secondary Battery)

A lithium secondary battery was manufactured in the same manner as in Comparative Example 7 except that the prepared non-aqueous electrolyte was used.

Comparative Example 12.

(Preparation of Non-Aqueous Electrolyte)

1.0 g of $LiBF_4$ and 0.3 g of a compound represented by Chemical Formula 2 were added to 98.7 g of an organic solvent in which 1 M $LiPF_6$ was dissolved (EC:EMC=volume ratio of 30:70) to prepare a non-aqueous electrolyte for a lithium secondary battery.

(Manufacture of Lithium Secondary Battery)

A lithium secondary battery was manufactured in the same manner as in Comparative Example 7 except that the prepared non-aqueous electrolyte was used.

Experimental Examples

Experimental Example 1. Measurement Method of Cycle Capacity

After being subjected to an activation process, each lithium secondary battery manufactured in Examples 1 to 12 and Comparative Examples 4, 5, 7, 8, and 10 to 12 was charged at 45° C. under a condition of a constant current/constant voltage (CC/CV) of 1.0 C until 2.9 V (current cut 5%), and discharged at 45° C. under a condition of a CC of 1.0 C until 2.1 V at 2 C.

In this case, discharge capacity measured after cell assembly/before storage at high temperature using charging/discharging equipment (PNE-0506 manufactured by PNE SOLUTION Co., Ltd; 5 V, 6 A) was defined as initial discharge capacity.

Afterward, each lithium secondary battery manufactured in Examples 1 to 12 and Comparative Examples 4, 5, 7, 8, and 10 to 12 was charged and discharged 500 times at 45° C. under a condition of a CC/CV of 1.0 C/1.0 C until 2.1 to 2.9 V (rest time: 10 minutes).

After charging and discharging 500 times, discharge capacity was measured, and results thereof are shown in Table 1 below.

TABLE 1

| | Non-aqueous electrolyte | | | | | Negative electrode active material | Positive electrode active material | Initial discharge capacity (mAh) | 500$^{th}$ discharge capacity (mAh) |
|---|---|---|---|---|---|---|---|---|---|
| | Organic solvent (Content) | Second lithium salt | | Additive | | | | | |
| | | Type | Content | Chemical Formula | Content | | | | |
| Example 1 | 98.7 g | $LiBF_4$ | 1.0 g | 1a | 0.3 g | LTO | LMO | 287 | 285 |
| Example 2 | 98.7 g | $LiBF_4$ | 1.0 g | 1b | 0.3 g | LTO | LMO | 287 | 284 |
| Example 3 | 98.7 g | $LiBF_4$ | 1.0 g | 1c | 0.3 g | LTO | LMO | 286 | 285 |
| Example 4 | 98.7 g | $LiBF_4$ | 1.0 g | 1d | 0.3 g | LTO | LMO | 285 | 287 |

TABLE 1-continued

|  | Non-aqueous electrolyte | | | | Negative | Positive | Initial | $500^{th}$ |
|  | Organic | Second lithium salt | | Additive | | electrode | electrode | discharge | discharge |
|  | solvent | | | Chemical | | active | active | capacity | capacity |
|  | (Content) | Type | Content | Formula | Content | material | material | (mAh) | (mAh) |
|---|---|---|---|---|---|---|---|---|---|
| Example 5 | 98.7 g | $LiBF_4$ | 1.0 g | 1e | 0.3 g | LTO | LMO | 287 | 283 |
| Example 6 | 98.7 g | $LiBF_4$ | 1.0 g | 1f | 0.3 g | LTO | LMO | 286 | 284 |
| Example 7 | 98.7 g | $LiBF_4$ | 1.0 g | 1g | 0.3 g | LTO | LMO | 289 | 284 |
| Example 8 | 98.7 g | $LiBF_4$ | 1.0 g | 1h | 0.3 g | LTO | LMO | 288 | 286 |
| Example 9 | 98.7 g | $LiBF_4$ | 1.0 g | 1i | 0.3 g | LTO | LMO | 288 | 282 |
| Example 10 | 98.95 g | $LiBF_4$ | 1.0 g | 1a | 0.05 g | LTO | LMO | 289 | 285 |
| Example 11 | 92 g | $LiBF_4$ | 1.0 g | 1a | 7.0 g | LTO | LMO | 279 | 271 |
| Example 12 | 98.99 g | $LiBF_4$ | 1.0 g | 1a | 0.01 g | LTO | LMO | 285 | 280 |
| Comparative Example 4 | 98.7 g | LiFSI | 1.0 g | 1a | 0.3 g | LTO | LMO | Excessive occurrence of side reaction | |
| Comparative Example 5 | 98.7 g (not including $LiPF_6$) | $LiBF_4$ | 1.0 g | 1a | 0.3 g | LTO | LMO | Cell operation was not possible | |
| Comparative Example 7 | 99.7 g | — | — | 1c | 0.3 g | Graphite | LMO | 740 | 185 |
| Comparative Example 8 | 98.7 g | $LiBF_4$ | 1.0 g | 1c | 0.3 g | Graphite | LMO | 745 | 200 |
| Comparative Example 10 | 98.7 g | $LiBF_4$ | 1.0 g | 2 | 0.3 g | LTO | LMO | 270 | 268 |
| Comparative Example 11 | 99.7 g | — | — | 2 | 0.3 g | Graphite | LMO | 742 | 202 |
| Comparative Example 12 | 98.7 g | $LiBF_4$ | 1.0 g | 2 | 0.3 g | Graphite | LMO | 747 | 205 |

In Table 1, LTO denotes $Li_{1.33}Ti_{1.67}O_4$, and LMO denotes $LiMn_2O_4$.

Referring to Table 1, it can be seen that the secondary batteries according to Examples 1 to 12 of the present invention, which included a non-aqueous electrolyte including all of a first lithium salt, $LiBF_4$ as a second lithium salt, and the compound represented by Chemical Formula 1 as an additive, exhibited a discharge capacity of 271 mAh or more, as measured after 500 cycles.

Meanwhile, the lithium secondary battery according to Comparative Example 4, which included LiFSI instead of $LiBF_4$ as a second additive, was not able to achieve desired performance because a side reaction excessively occurred.

In addition, it can be seen that, in the case of the secondary battery according to Comparative Example 5, which included a non-aqueous electrolyte only including $LiBF_4$ as a second lithium salt and not including a first lithium salt, cell operation was not possible.

Meanwhile, in the case of the lithium secondary batteries prepared in Comparative Examples 7, 8, 11 and 12 using graphite as the negative electrode active material, the initial discharge capacity was 740 mAh or more, while the discharge capacity after 500 cycles was about 205 mAh or less, which were poorer than those of the secondary batteries according to Examples 1 to 12.

In addition, it can be seen that the secondary battery according to Comparative Example 10, which included the compound represented by Chemical Formula 2 instead of the compound represented by Chemical Formula 1 as an additive, exhibited an initial discharge capacity and a discharge capacity after 500 cycles lower than those of the secondary batteries according to Examples 1 to 12.

Experimental Example 2. Measurement Method of Increase in Resistance Upon Storage at High Temperature Each lithium secondary battery manufactured in Examples 1 to 12 and Comparative Examples 1 to 3 and 6 to 12 was charged to 70% SOC at 25° C., and initial resistance was measured.

Subsequently, each lithium secondary battery was stored at 60° C. for 1 week, then charged to 50% SOC at 1 C, and discharged at 10 C for 10 seconds, and an increase rate of resistance with respect to the initial resistance was measured. The increase rate (%) of resistance thus measured is shown in Table 2 below.

Experimental Example 3. Measurement Method of Amount of Gas Generated Upon Storage at High Temperature Each lithium secondary battery manufactured in Examples 1 to 12 and Comparative Examples 1 to 3, 9, and 10 was put into an ethanol-containing bath, and initial volume was measured.

Subsequently, each lithium secondary battery was charged to 70% SOC at 25° C., then stored in a chamber at 60° C. for 1 week, and put into an ethanol-containing bath, and a volume change rate after storage at high temperature was measured.

Amounts of generated gas (cc) obtained from the volume change rate thus measured are shown in Table 2 below.

TABLE 2

| | Non-aqueous electrolyte | | | | | Negative | Positive | After storage at high temperature of 60° C. for 1 week | |
|---|---|---|---|---|---|---|---|---|---|
| | Organic solvent (content) | Second lithium salt | | Additive | | electrode active material | electrode active material | Increase rate of resistance compared to initial resistance (%) | Amount of generated gas (cc) |
| | | Type | Content | Chemical Formula | Content | | | | |
| Example 1 | 98.7 g | LiBF$_4$ | 1.0 g | 1a | 0.3 g | LTO | LMO | 12 | 12 |
| Example 2 | 98.7 g | LiBF$_4$ | 1.0 g | 1b | 0.3 g | LTO | LMO | 13 | 15 |
| Example 3 | 98.7 g | LiBF$_4$ | 1.0 g | 1c | 0.3 g | LTO | LMO | 12 | 13 |
| Example 4 | 98.7 g | LiBF$_4$ | 1.0 g | 1d | 0.3 g | LTO | LMO | 13 | 15 |
| Example 5 | 98.7 g | LiBF$_4$ | 1.0 g | 1e | 0.3 g | LTO | LMO | 14 | 17 |
| Example 6 | 98.7 g | LiBF$_4$ | 1.0 g | 1f | 0.3 g | LTO | LMO | 13 | 14 |
| Example 7 | 98.7 g | LiBF$_4$ | 1.0 g | 1g | 0.3 g | LTO | LMO | 12 | 16 |
| Example 8 | 98.7 g | LiBF$_4$ | 1.0 g | 1h | 0.3 g | LTO | LMO | 14 | 17 |
| Example 9 | 98.7 g | LiBF$_4$ | 1.0 g | 1i | 0.3 g | LTO | LMO | 15 | 17 |
| Example 10 | 98.95 g | LiBF$_4$ | 1.0 g | 1a | 0.05 g | LTO | LMO | 15 | 19 |
| Example 11 | 92 g | LiBF$_4$ | 1.0 g | 1a | 7.0 g | LTO | LMO | 18 | 21 |
| Example 12 | 98.99 g | LiBF$_4$ | 1.0 g | 1a | 0.01 g | LTO | LMO | 16 | 22 |
| Comparative Example 1 | 99 g | LiBF$_4$ | 1.0 g | x | X | LTO | LMO | 21 | 30 |
| Comparative Example 2 | 99.7 g | x | — | 1a | 0.3 g | LTO | LMO | 19 | 28 |
| Comparative Example 3 | 99.7 g | x | — | 1i | 0.3 g | LTO | LMO | 26 | 35 |
| Comparative Example 6 | 89 g | LiBF$_4$ | 1.0 g | 1a | 10 g | LTO | LMO | Increased 200% compared to Example 1 | — |
| Comparative Example 7 | 99.7 g | — | — | 1c | 0.3 g | Graphite | LMO | 32 | — |
| Comparative Example 8 | 98.7 g | LiBF$_4$ | 1.0 g | 1c | 0.3 g | Graphite | LMO | 31 | — |
| Comparative Example 9 | 99.7 g | — | — | 2 | 0.3 g | LTO | LMO | 20 | 26 |
| Comparative Example 10 | 98.7 g | LiBF$_4$ | 1.0 g | 2 | 0.3 g | LTO | LMO | 21 | 25 |
| Comparative Example 11 | 99.7 g | — | — | 2 | 0.3 g | Graphite | LMO | 35 | — |
| Comparative Example 12 | 98.7 g | LiBF$_4$ | 1.0 g | 2 | 0.3 g | Graphite | LMO | 33 | — |

In Table 2, LTO denotes Li$_{1.33}$Ti$_{1.67}$O$_4$, and LMO denotes LiMn$_2$O$_4$.

Referring to Table 2, it can be seen that, in the case of the secondary batteries according to Examples 1 to 12 of the present invention, which included a non-aqueous electrolyte including all of a first lithium salt, LiBF$_4$ as a second lithium salt, and the compound represented by Chemical Formula 1 as an additive, an increase rate in resistance was 18% or less, and gas was generated in an amount of 22 cc or less after storage at high temperature due to their excellent effect of forming a SEI film.

On the other hand, it can be seen that, in the case of the lithium secondary battery according to Comparative Example 1 not including an additive and the lithium secondary batteries according to Comparative Examples 2 and 3 not including LiBF$_4$ as a second lithium salt, an increase rate in resistance was 19% or more, and gas was generated in an amount of 28 cc or more after storage at high temperature, which were higher than those of the secondary batteries according to Examples 1 to 12.

In addition, it can be seen that the lithium secondary battery according to Comparative Example 6, which included a non-aqueous electrolyte including an excessive amount of an additive, exhibited an increase in resistance of 200% compared to Example 1 due to occurrence of a side reaction caused by an excess additive.

In addition, it can be seen that the lithium secondary batteries according to Comparative Examples 7 and 8, which included graphite as a negative electrode active material, exhibited an increase rate in resistance of 32% and 31%, respectively, after being stored at high temperature, which were higher than those of the secondary batteries according to Examples 1 to 12.

In addition, it can be seen that the secondary batteries according to Comparative Examples 9 to 12, which included the compound represented by Chemical Formula 2 instead of the compound represented by Chemical Formula 1 as an additive, exhibited an increase rate in resistance of 20% or more after being stored at high temperature, which were higher than those of the secondary batteries according to Examples 1 to 12.

In particular, it can be seen that, in the case of the secondary batteries according to Comparative Examples 9 and 10, which included the compound represented by Chemical Formula 2 instead of the compound represented by Chemical Formula 1 as an additive, gas was generated in an amount of 26 cc and 25 cc, respectively, after storage at high temperature, which were higher than those of the secondary batteries according to Examples 1 to 12.

According to the present invention, a non-aqueous electrolyte for a lithium secondary battery, which is capable of forming a robust SEI film on the surface of a LTO negative electrode, can be prepared by including at least two types of lithium salts and a pyridine-boron-based compound. In addition, a lithium secondary battery including a LTO negative electrode, which has an effect of suppressing an increase in resistance and the generation of gas after being stored at high temperature by suppressing a side reaction at an interface between an electrode and an electrolyte, can be manufactured by using the non-aqueous electrolyte.

The invention claimed is:

1. A non-aqueous electrolyte for a lithium secondary battery comprising:
   an organic solvent;
   a first lithium salt;
   LiBF$_4$ as a second lithium salt; and
   a non-aqueous electrolyte additive selected from the group consisting of compounds represented by Chemical Formulas 1a to 1h below,
   wherein the first lithium salt is included at a concentration of 0.1 M to 2 M in the non-aqueous electrolyte,
   wherein LiBF$_4$ is included in an amount of 0.1 wt % to 20 wt % based on a total weight of the non-aqueous electrolyte,
   wherein the non-aqueous electrolyte additive is included in an amount of 0.01 wt % to 8.5 wt % based on the total weight of the non-aqueous electrolyte:

[Chemical Formula 1a]

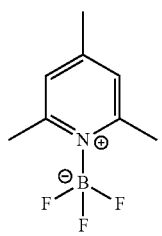

[Chemical Formula 1b]

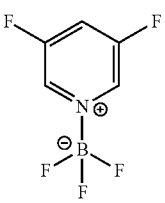

[Chemical Formula 1c]

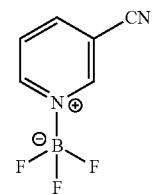

[Chemical Formula 1d]

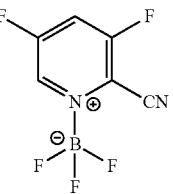

[Chemical Formula 1e]

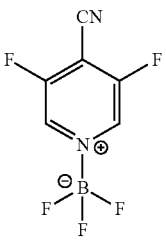

[Chemical Formula 1f]

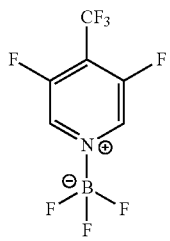

[Chemical Formula 1g]

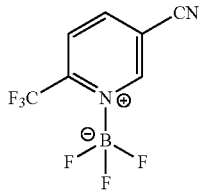

[Chemical Formula 1h]

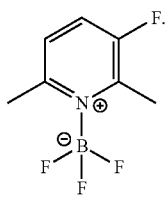

2. The non-aqueous electrolyte of claim 1, wherein the non-aqueous electrolyte additive is included in an amount of 0.01 wt % to 7.0 wt % based on a total weight of the non-aqueous electrolyte.

3. The non-aqueous electrolyte of claim 1, wherein the non-aqueous electrolyte additive is included in an amount of 0.1 to 7.0 wt % based on a total weight of the non-aqueous electrolyte.

4. A lithium secondary battery comprising a negative electrode, a positive electrode, a separator interposed between the negative electrode and the positive electrode, and a non-aqueous electrolyte,
   wherein the negative electrode includes lithium titanium oxide (LTO) as a negative electrode active material, and
   the non-aqueous electrolyte is the non-aqueous electrolyte for a lithium secondary battery of claim 1.

5. The lithium secondary battery of claim 4, wherein the LTO is at least one selected from the group consisting of Li$_{0.8}$Ti$_{2.2}$O$_4$, Li$_{2.67}$Ti$_{1.33}$O$_4$, Li$_{1.14}$Ti$_{1.71}$O$_4$, Li$_{1.33}$Ti$_{1.67}$O$_4$, Li$_4$Ti$_5$O$_{12}$, and LiTi$_2$O$_4$.

6. The lithium secondary battery of claim 5, wherein the LTO is Li$_{1.33}$Ti$_{1.67}$O$_4$.

7. The lithium secondary battery of claim 4, wherein the positive electrode includes at least one positive electrode active material selected from the group consisting of a lithium-manganese-based oxide, a lithium-nickel-manganese-based oxide, a lithium-manganese-cobalt-based oxide, and a lithium-nickel-manganese-cobalt-based oxide.

8. The lithium secondary battery of claim 7, wherein the positive electrode active material is LiMnO$_2$ or LiMn$_2$O$_4$.

* * * * *